June 19, 1962

L. Z. LA FOREST

DICTATING MACHINES 3,040,135

Filed Sept. 26, 1957

2 Sheets-Sheet 1

INVENTOR
Louis Z. LaForest
BY George H. Fritzinger
Agt.

June 19, 1962 L. Z. LA FOREST 3,040,135

DICTATING MACHINES

Filed Sept. 26, 1957 2 Sheets-Sheet 2

INVENTOR
Louis Z. LaForest
BY George H. Fritzinger
Agt.

United States Patent Office 3,040,135
Patented June 19, 1962

3,040,135
DICTATING MACHINES

Louis Z. La Forest, Parsippany-Troy Hills Township, Morris County, N.J., assignor to McGraw-Edison Company, Elgin, Ill., a corporation of Delaware Filed Sept. 26, 1957, Ser. No. 686,497
11 Claims. (Cl. 179—100.2)

This invention relates to dictating machines which operate in connection with a magnetic record medium, and more particularly it relates to novel means for and methods of recording and reproducing indexing marks on and from magnetic records within the confines of the usable area of the records bearing the recorded sound tracks.

It is the usual practice to provide phonographic machines adapted especially for recording dictation with means by which the user can make registrations in a spatial relationship to the positioning of the recording head on the record to indicate for the benefit of the transcriber points on the record whereat "lengths" and "corrections" are made, the term "lengths" being used herein to mean points on the record where separate items of dictation are started and ended. Typically, these registrations have been made in the form of visible marks on a so-called indexing slip separate from the record itself. This requires that each index slip be attached to the respective record or that each slip and record be suitably marked so that one will not become lost from the other during the handling of the records as between the user and transcriber. Additionally, this prior procedure involves the difficulty of having to separately mount and remove the index slips both with respect to the recording and transcribing machines. The present invention circumvents these difficulties by use of a novel method of recording and reproducing on a magnetic record medium which enables the index marks to be made directly on the record at the places bearing the recorded dictation to which the marks pertain and to be thereafter reproduced independently of the sound tracks in the same area bearing the recorded dictation.

A feature of the invention is in recording the index marks with the use of a magnetic index recording head having its magnetic gap oblique to the direction of record movement and in reproducing the indexing marks by relatively moving the same index head and record at right angles to that direction of record movement. The index marks may be recorded in or along the sound tracks bearing the recorded dictation, and selective reproduction during the relative crosswise movement between the index head and record is made possible by having the gap of the index head at an angle—either oblique or at right angles—to the gap of the sound recording head.

Accordingly, it is an object to provide a new method of recording and reproducing on a magnetic record medium wherein a signal is recorded by relative movement between a head and record in one direction with the gap of the head oblique to that direction, and the signal is reproduced by relatively moving the same head and record in a crosswise direction preferably at right angles to the sound recording track.

Another object is to provide a novel method of recording and reproducing on a magnetic record medium which permits indexing marks to be recorded magnetically directly on the record and to be reproduced selectively therefrom notwithstanding the presence of the sound record tracks in the same area.

Another object is to provide a dictating machine with a facility for recording indexing marks in or along the sound record tracks at the points on the record where the indexing marks pertain, and for reproducing the index marks selectively by moving the indexing head crosswise of the record while the record is at standstill.

Another object is to place magnetic indexing marks or registrations for a "length," "correction" or other indication in respective rectilinear paths crosswise of the record.

Another object is to provide a novel method of recording on a magnetic record medium which enables a greater concentration of recorded intelligence of different character within a given area on the record.

A further object is to provide a magnetic record medium having a novel magnetic pattern of recording thereon bearing different items of intelligence recorded in one direction one of which is adapted to be reproduced by movement of a pick-up head relative to the record in a crosswise direction.

Another object is to provide a dictating machine with novel apparatus by which indexing marks can be recorded on the record medium and reproduced selectively therefrom in the manner aforestated and to fulfillment of the aforestated objects.

These and other objects and features of the invention will be apparent from the following description and the appended claims.

In the description of the invention reference is had to the accompanying drawings, of which:

FIGURE 1 is a fractional plan view of a magnetic type of dictating machine incorporating my invention;

FIGURES 2 and 3 are fractional vertical sectional views taken substantially on the lines 2—2 and 3—3 respectively of FIGURE 1;

Figure 1:
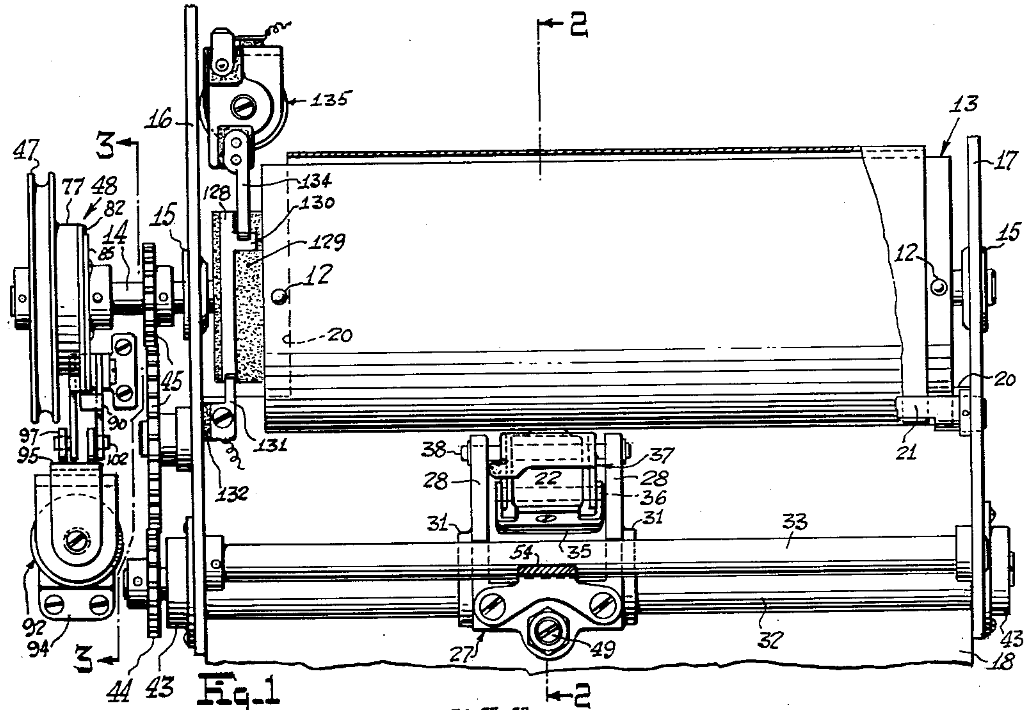
Figure 2:
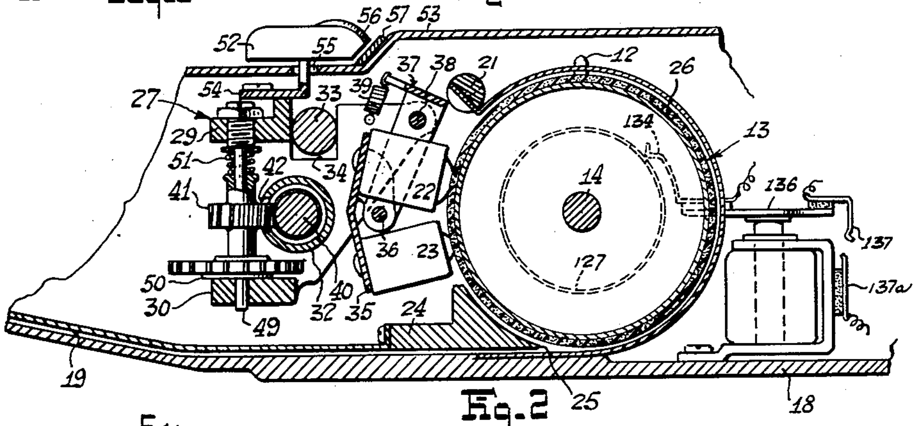
Figure 3:
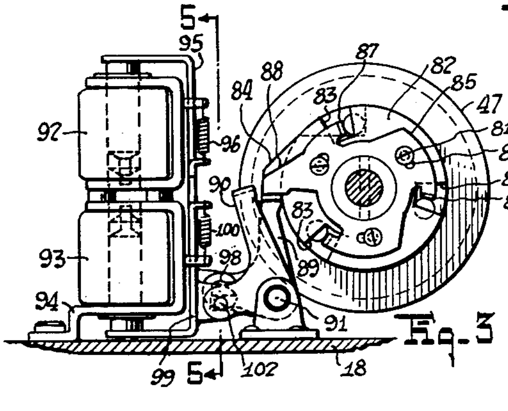

The invention is herein illustrated and described in connection with a magnetic dictating machine of the type using a magnetic sheet record 10 fractionally shown in FIGURE 8, which sheet record typically comprises a non-magnetic backing film coated with dispersed magnetic particles. Such sheet record may have apertured corner portions at its leading edge, as indicated at 11, for hooking the sheet record onto radial pins 12 projecting from the end portions of a record-supporting drum 13 (FIGURES 1 and 2). The drum has a shaft 14 journaled at its ends in bearings 15 mounted in side standards 16 and 17 upstanding from a base 18. The loading of a sheet record onto the drum may be carried out by inserting the record leading edge first through a slot 19 leading rearwardly to the underside of the drum, the loading position being one where the apertures 11 are below the drum in the path of the drive-pins 12. Upon advancing the drum counter clockwise (FIGURE 2) the pins will sweep across the leading corner portions of the record and flex the same downwardly through clearance openings 20 (FIGURE 1) at the underside of the slot 19 until the pins register with the openings 11, whereupon the sheet will spring upwardly and become attached to the drum. The sheet will then be carried into wrap-around relation to the drum as the advance of the drum is continued. In order to confine the trailing portion of the sheet record in close peripheral relationship to the drum the lower wall of the slot 19 is continued around the backside of the drum at a clearance spacing therefrom to the upper front side of the drum, whereat it is supported by a crossrod 21 carried at its ends by the side-standards. The front side of the drum is exposed for access thereto of a combined erase-index head 22 and a recording head 23. Below these heads there is a wedge-shaped crossbar 24 flush with the top wall of the loading slot 19 and having a rearward face in spaced relation to the drum. The rearward edge 25 of this crossbar is a stripping edge for engaging the underside of the trailing portion of the sheet record to direct the record outwardly through the slot 19 when the drum is reversed. A rubber sleeve 26 on the drum provides a usable backing for the sheet record so that the heads will have even engagement therewith.

At the front of the drum there is a rectangular carriage 27 having spaced vertical side walls 28 bridged at the top and bottom by crossbars 29 and 30 (FIGURE 2). The side walls have bearings 31 embracing a tubular support rod 32 mounted at its ends in the side-standards. The carriage is held stabilized about the support rod 32 by a second crossrod 33 which extends slidably through rectangular notches 34 in the upper portions of the side walls 28 and is mounted also at its ends in the side-standards. The heads 22 and 23 are mounted on a rocker 35 having side lugs positioned midway between the heads at 36 and pivoted to the lower end of an inverted U-lever 37. This lever is pivoted to the carriage on a cross-rod 38 above the erase-index head and is biased rearwardly, to press the heads against the mounted sheet record on the drum, by means of a tension spring 39 connected between the lever and the carriage.

Figure 10:
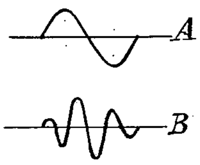
FIGURE 10 is a showing of the character of pulses picked up by the indexing head when moved crosswise of the indexing tracks.

The carriage is fed progressively along the drum as the drum is rotated by means of a feedscrew 40 extending through the tubular support rod 32 and a circular feednut 41 on the carriage which extends through a clearance slot 42 in the rod 32 into engagement with the feedscrew. The rod 32 may be fitted into flanged caps 43 riveted to the side-standards. In these end caps are central openings forming bearings for the ends of the feedscrew. The left end portion of the feedscrew extends beyond the respective end cap 43 and has a pinion gear 44 secured thereto which is connected by means of a gear train 45 to the shaft 14 of the drum. Rotation of the drum is effected by a suitable motor 46 (FIGURE 10) coupled by a belt (not shown) to a pulley 47 freely journaled on the left end of the shaft 14 and coupled thereto by means of a clutch 48 hereinafter described.

The circular feednut 41 is mounted rotatably on a headed pin 49 having its lower end fitting into an opening in the crossbar 30 and its head portion threaded in the crossbar 29 of the carriage. Interposed between the lower end of the hub of the feednut 41 and bar 30 is a friction washer 50, and interposed between the upper end of the hub and the head of the pin is a compression spring 51 which exerts pressure on the friction washer. By threading the head of the pin 49 upwardly and downwardly the pressure on the friction washer can be varied to provide the desired rotational restraint on the circular feednut. Typically, this rotational restraint is set so that it will not yield to the forces exerted on the feednut by the feedscrew for driving the carriage along the drum but can be still overcome readily by hand to shift the carriage along the drum. For this purpose the carriage may have a handle 52 above the housing 53 of the machine, which is mounted on an L bracket 54 that is secured to the carriage and extended through a clearance slot 55 in the housing. Also, this handle may be provided with a pointer 56 which may indicate the positioning of the carriage with respect to an adjacent scale 57 on the housing.

The heads 22 and 23 are of the magnetic type having magnetic cores passing through respective coils and provided with gapped pole pieces for engaging the record, as is hereinafter more fully described. When a high frequency current is fed to the erase portion of the erase-index head 22 hereinafter referred to simply as the erase-head it clears the track on the record scanned thereby of all prior recording. The recording head 23 and the index portion of the erase-index head 22 which follow the gap of the erase-head then provide a magnetic pattern on the record according to the signals fed thereto. In order that the present invention may be more clearly understood the nature of the recorded sound and index signals on the record and the mode of picking up only the index signals are illustrated with reference to FIGURE 9.

Figure 9:
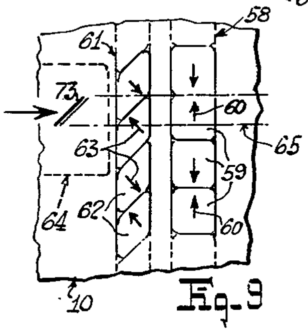
FIGURE 9 is an enlarged view of both sound and indexing tracks showing the character of the magnetic domains recorded on the record by the recording and indexing heads respectively, and indicating the mode of reproducing the indexing pulses.

In FIGURE 9 the path 58 represents a track scanned by the pole pieces of a recording head with the magnetic gap of the head at right angles to the track. Upon feeding a sinusoidal current to the head and moving the same at a uniform speed along the track, the magnetic flux from the pole pieces enters the record material at the gap and magnetizes successive areas or domains 59 thereof in alternate directions lengthwise of the track as indicated by the arrows 60. The length and intensity of the magnetic domains depends upon the frequency and intensity of the current fed to the recording head. For instance, if the head is moved at about 2.1 inches per second and the frequency is 60 cycles per second two of the domains representing one cycle of current will be spread over about .036 inch along the track. If the same head now used as a reproducer is moved along the track 58 at the same speed and with its magnetic gap again at right angles to the track the flux lines from the magnetic domains, being at right angles to the gap, will enter the pole pieces and thread the coil of the head to induce a cyclic current therein having the same frequency as the original current and also an intensity in proportion thereto.

If the gap of a recording head is inclined to the lengthwise direction of a track 61, say at 45 degrees as indicated also in FIGURE 9, and a sinusoidal current is fed to the head while the same is moved along the track at uniform speed, it will magnetize again successive domains 62 of the record material in alternate directions but the directions of polarization are inclined 45 degrees to the track as indicated by the arrows 63. If the same head is next moved along the track at uniform speed and with its magnetic gap still at the same angle to the track, the magnetic flux from the successive magnetic domains 61, being again at right angles to the gap, will enter the pole pieces and thread the coil of the head to induce a cyclic current of the same frequency and character as that of the original current, the only difference being that the efficiency of the recording is now reduced by the cosine of the angle of the magnetic gap to the lengthwise direction of the track.

If a head as indicated at 64 is swept sidewise across the track 61 while the gap is still inclined by the same angle to the track, the gap will be moved progressively onto the track from one side and then progressively off at the other side but with the gap again at right angles to the flux lines of the respective domains 62. The result is that a pulse of current is induced in the coil of the head as the head is moved across the track. If the length of successive domains is such that the gap of the head crosses only two domains as it is moved across the track as illustrated in FIGURE 9, the induced current is a single cycle as indicated by curve A of FIGURE 10. If the recorded signal has, for example, a three times higher frequency, an oscillatory pulse of 3 cycles as shown by curve B of FIGURE 10 would be induced in the coil of the head, as the head is swept sidewise across the track.

When the same head with its gap at 45 degrees to the tracks is moved sidewise across the sound track 58 as indicated by the dotted lines 65, there will be induced either a D.C. pulse or a single-cycle pulse in the head, depending on whether the gap of the head crosses over a single magnetic domain 59 or parts of two of such domains. If it crosses a single domain the resultant D.C. pulse will be attenuated only by the cosine of the angle between the gap and the direction of magnetization of the domain, but if it crosses partially over two domains the resultant single-cycle pulse will be further attenuated because of cancellation effects arising from the gap traversing domains of opposite polarity at the same time. Thus, if the lowest frequency recorded in the track 58 is such that at least two or more magnetic domains are recorded in the track 58 within the width of span of the head 64 crossing the track, the pick-up from the track 58 is relatively very small. Of course, by the same principles there would be no pick-up by the head 64 crossing the track 58 were the directions of polarization of the magnetic domains in the sound track 58 at right angles to those in the track 61—i.e., in alignment with the gap of the head 64 as it crosses the track 58. However, the efficiency of the sound recording in the track 58 would then be reduced.

I have herein utilized the foregoing principles in a dictating machine for the purpose of recording indexing marks directly on the magnetic record medium in or along the tracks bearing the recorded voice signals while enabling the same to be picked up independently of the recorded voice signals for the benefit of the transcriber when the recorded dictation is to be typed. Preferably, I record the indexing marks on a track along the sound track as indicated in FIGURE 8 wherein the sound-track convolutions are indicated at 66 and the intervening indexing track convolutions are indicated at 67. The sound track is recorded with the use of the standard recording head 23 but the indexing track is recorded by the index-recording portion of the combined erase-index head 22 herein next described.

Figure 7:
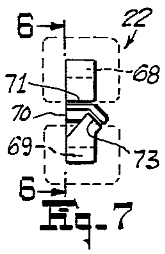
FIGURE 7 is an end view of this erase-index head as seen from the line 7—7 of FIGURE 6.
Figure 6:
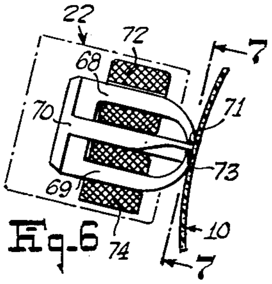
FIGURE 6 is an enlarged view of a combined erase-index head showing the coils in section as seen from the line 6—6 of FIGURE 7.

The combined erase-index head 22 may have U-shaped magnetic pole pieces 68 and 69 riveted to a central T-shaped pole piece 70 to form two magnetic circuits. The terminal portions of the pole piece 68 and central pole piece 70 cooperate to form a magnetic gap 71 at right angles to the core as shown in FIGURE 7. This is the gap for the erase head. The length of this gap is equal to the width of the sound track 66 and indexing track 67 i.e., to the full distance between successive track convolutions but the erase-index head 22 is so positioned on the carriage relative to the record head 23 that the gap of the erase head is symmetrically disposed with respect to the sound track 66 as indicated in FIGURE 8. On the pole piece 68 associated with the gap 71 is an erase coil 72. The central pole 70 has also an offset inclined terminal portion forming with an inclined terminal portion of the pole piece 69 an inclined magnetic gap 73 for the index portion of the head 22 which trails the gap 71 on the record and overlaps by one-half its width the track on the record of the magnetic gap 71. By placing the gap of the sound recorder head 23 in a position which is circumferentially of the drum midway the gap 71 of the erase head and which starts from the inner edge of the gap 73 of the index head, the gap 73 of the index head fills the space between successive sound track convolutions 66. On the pole piece 69 associated with the gap 73 is an indexing coil 74. Since the gap 73 is both offset and inclined to the gap of the sound recording head 23, it is adapted for recording indexing signals in the track convolutions 67 and for picking up the same substantially independently of the recorded sound tracks when the erase-index head 22 is moved across the tracks with the indexing portion of the head operating as a reproducer.

Figure 8:
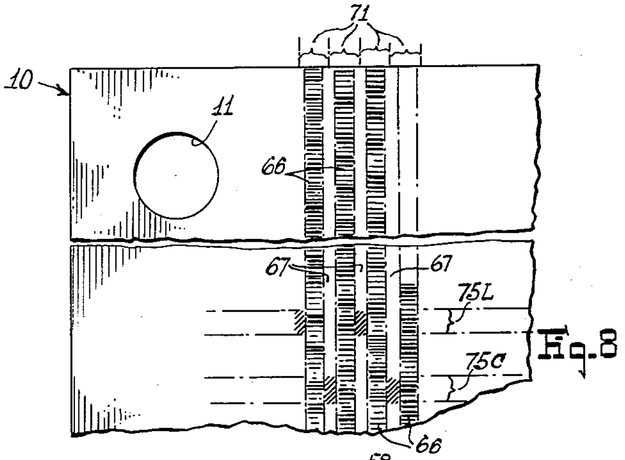
FIGURE 8 is a fractional view of a sheet record medium used in the present machine on which is depicted visually the character of the magnetic pattern recorded on the record by the present invention.

However, as will appear, a means is provided to enable the indexing portion of the head 22 to be activated for making correction and length marks only when the drum is in predetermined respective positions of rotation, this being done so that the correction and length marks will be confined in respective paths 75–C and 75–L lengthwise of the drum as indicated in FIGURE 8. Also, as an aid to the transcriber in reproducing the recorded indexing signals, the clutch 48 is made special so that the drum will come to rest always with the gap 73 of the index head in registration with the correction indexing path 75–C each time the drive system is stopped.

The clutch 48 is of the Horton one-way type comprising a drum 76 pinned to the mandrel shaft 14 and surrounded by an annular flange 77 on the right side of the driven pulley 47. The drum is provided with three peripheral notches 78 equiangularly spaced from each other. Each notch is a right angular one having one side 78*a* in a direction radial of the drum and another side 78*b* on a chord thereof but extending counter clockwise from the side 78*a* and through the periphery of the drum. Provided in each notch is a ball or roller 79 and in each wall 78*a* there is a recess housing a compression spring 80 which bears against the roller normally to wedge it between the wall 78*b* of the drum and the surrounding flange 77. By this wedging action the driven pulley 47 is normally rotatably locked to the drum 76 for driving the drum 13 in a counter clockwise direction as it appears in FIGURE 2.

Figure 4:
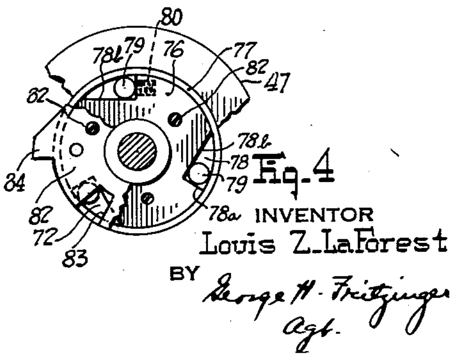
FIGURE 4 is a view with parts broken away of a portion of the machine shown in FIGURE 3.
Figure 5:
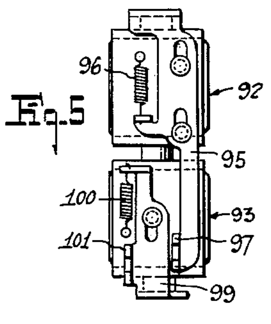
FIGURE 5 is a side elevational view of the clutch-operating electromagnets as seen from the line 5—5 of FIGURE 3.

Secured rigidly by screws 81 to the outer side of the drum 76 is a generally circular plate 82 which confines the rollers 79 in the notches 78. However, this plate has three peripheral notches 83 (FIGURE 4) registering with the notches 78 to provide access for control purposes to the outside sides (the counter clockwise sides seen in FIGURE 4) of the rollers 79, and has one peripheral tooth 84 extending radially beyond the housing 77 of the clutch. Mounted flat against the plate 82 is a second plate 85 having short arcuate slots 86 through which pass the mounting screws 81 to permit a small angular shifting of the plate relative to the clutch drum 76. This plate 85 has three inwardly extending fingers 87 which pass through the slots 83 of the plate 82 and into the notches 78 at the outer sides of the rollers 79. This plate 85 has also a single peripheral tooth 88 overlying the tooth 84 but held normally shifted in a counter clockwise direction therefrom by engagement of the rollers 79 with the fingers 87. At the front of the clutch 48 there are two side-by-side upstanding stop pawls 89 and 90 of different lengths pivoted at 91 to a bracket on the base 18 of the machine. The shorter pawl 89 is normally positioned in the path of the teeth 84 and 88 and the longer pawl 90 is normally positioned beyond this path. The pawls 89 and 90 are operable by respective electromagnets 92 and 93 mounted on a bracket 94 on the base 18 in vertically lined positions. As shown, for example, in FIGURE 5, the electromagnet 92 has an armature 95 urged upwardly by a spring 96 and provided with a forked lug 97 interlocked at 98 with an arm of pawl 89, and the electromagnet 93 has an armature 99 biased downwardly by a spring 100 and provided with a forked lug 101 interlocked at 102 with an arm of the pawl 90.

To start the drum 13 while the pulley 47 is rotating, the electromagnet 92 is energized to release the pawl 89, thereby enabling the springs 80 to move the rollers into their wedging positions wherein they couple the pulley to the drum 13. Reversely, when the electromagnet 92 is deenergized the pawl is returned into a position wherein the tooth 88 will first be impinged thereagainst, cushioning the advance movement of the drum under influence of the springs 80 and concurrently shifting the rollers 79 out of their wedging positions to release the driving engagement between the pulley 47 and the drum. Upon further counter clockwise inertial movement of the drum under the cushioning influence caused by the prior engagement of the pawl 89 with the tooth 88, the fixed tooth 84 on the drum 76 abuts against the pawl to bring the drum to a complete stop. This stop position of the drum is that in which the indexing gap 73 registers with the correction-indexing path 75–C of the mounted sheet record.

If while the pawl 89 is withheld from causing the clutch 48 to be engaged, the electromagnet 93 is energized, then the longer pawl 90 is shifted into the path of the clutch teeth 84 and 88 to cause the drum to be stopped in the same manner as before but in a slightly different angular position due to the longer length of the pawl 90, this position of the drum 13 being that in which the magnetic gap 73 of the erase-indexing head registers with the length-indexing path 75–L on the mounted sheet record.

Figure 11:
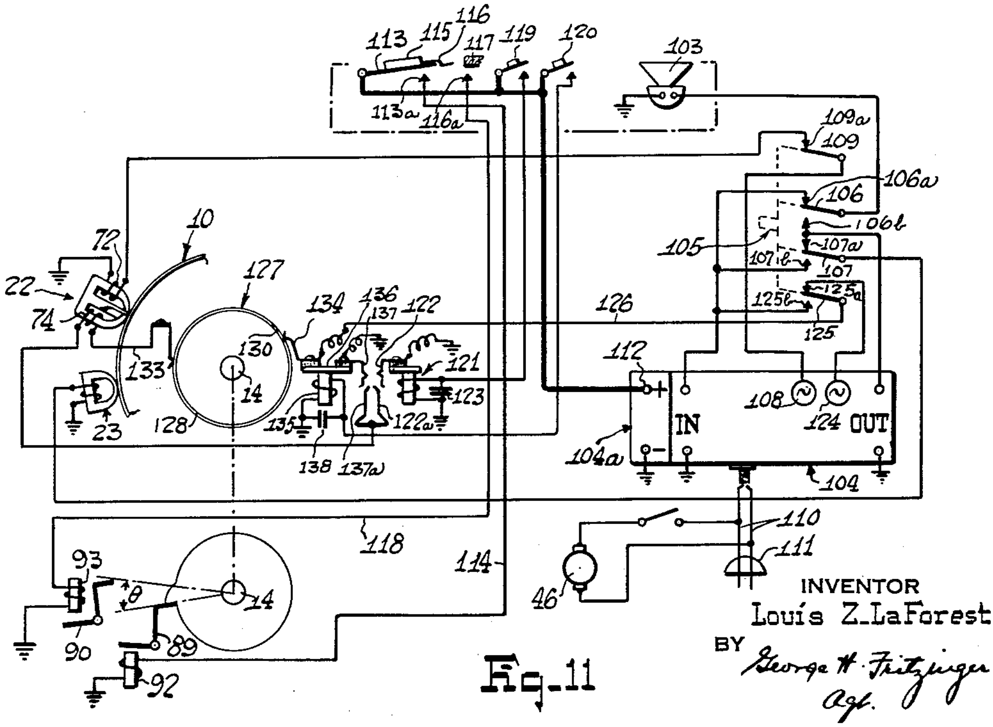
FIGURE 11 is a schematic circuit diagram of the control apparatus of the dictating machine.

The control circuitry and apparatus shown in FIGURE 11 comprises a transducer 103 usable as a microphone during recording and as a receiver or speaker during reproducing, an amplifier-oscillator 104, and a record-reproduce changeover switch 105. When the switch 105 is in its record position, as shown, the transducer 103 operating as a microphone is connected via switch pole 106 and contact **106*a* to the amplifier input, and the output of the amplifier is connected via contact 107 and pole 107*a* to the sound recording head 23. In order to simplify the description and drawing only single line circuitry with ground return is shown. The erase coil is energized from a source 108 via pole 109 and contact 109*a* of the switch 105 to cause any prior recording which may be on the record to be erased progressively in advance of the sound recording head. The high frequency source 108 may also be employed to provide the usual high frequency bias current to the sound recording head but this is not shown. When the record-reproduce switch 105 is shifted downwardly into reproduce position the contacts 109–109*a* are open to remove current from the erase coil 74, the pole 107 is made with a contact 107*b* to connect the head 23 now acting as a reproducer to the input of the amplifier, and the pole 106 is made with a contact 106*b* to connect the output of the amplifier to the transducer 103** now acting as a receiver.

The amplifier 104 is energized from a power line 110 having the usual connector plug 111. This power line may also connect to the motor 46 as shown. From the rectifier-filter section **104*a* of the amplifier 104 D.C. power is taken from a terminal 112 for operating different control relays and electromagnets of the dictating machine. Thus, there is provided a start-stop switch comprising a pole 113 which when pressed will close with contact 113*a* to provide D.C. operating power from the terminal 112 via lead 114 to the start electromagnet 92 whereby to cause the clutch to be engaged as before described, and when the start-stop switch 113 is released this clutch is disengaged. If the switch pole 113 is depressed and a shiftable button 115 thereon carrying a contact 116 is shifted outwardly the button becomes latched under a catch 117 to cause the contact 116 to make with a stationary contact 116*a*. This completes a circuit from the terminal 112 via lead 118 to energize the electromagnet 93. Thus, in so energizing also the electromagnet 93 its stop pawl 90 is shifted into operate position to cause the clutch to be disengaged and the drum 13 stopped in a position slightly shifted from normal whereat the erase-inder head is in registration with the length-indexing path 75–L. An advantage in so locking the start-stop switch in operate position is that it permits the transcriber to have freedom of both hands when scanning the path 75–L for reading of the length marks. Upon releasing the start-stop switch the electromagnets 92 and 93 are deenergized to cause the drum 13 to be advanced a little more than one revolution and then stopped with the erase-index head in registration with the correction-indexing path 75–C**.

To make correction and length marks, the dictator need simply press the respective switches 119 and 120 momentarily while the drum 13 is in rotation and the record-reproduce switch 105 is in record position. For example, upon pressing the switch 119 a circuit is closed from the plus terminal 112 to energize a relay 121 and close its movable contact 122 with stationary contact **122*a*. This completes connection of one side of the indexing coil 74 to ground, which connection is maintained for the duration of one revolution of the drum 13 notwithstanding that the dictator may immediately release the switch 119, because a condenser 123 is connected across the coil of the relay 121 to delay the drop-out of the relay. Upon the indexing coil being so grounded it will receive a momentary oscillatory pulse from a source 124 as soon as the the drum 13 is advanced to the point where the gap 73 of the index-head is in registration with the transverse path 75–C on the record. This is accomplished by the circuit running from the oscillatory source 124 to the other side of the indexing coil through contact 125 and pole 125*a* of the record-reproduce switch 105, lead wire 126 and commutator 127. The commutator comprises a slip ring 128 mounted on an insulating core 129 provided at the left end of the drum 13. This commutator has a single conductor ring with one side bar 130 flush with the core 129 as shown in FIGURE 1. In continuous engagement with the ring is a brush 131 insulatedly mounted on the left standard 16 at 132. This brush is connected by a lead 133 to the other side of the indexing coil. Circumferentially in line with the side bar 130 is a brush 134 connected to the lead 126. During the momentary engagement of the brush 134 with the side bar 130 the circuit is completed to cause the indexing head to record a pulse sigal on the record within the transverse path 75–C** on the record.

Upon the dictator presing the length-marking switch 120 while the drum is in rotation the indexing head is again momentarily energized through the commutator 127 but the brush 134 is now shifted about the axis of the drum 13 by the same angle as the angle $\theta$ shown in FIGURE 11, which is the angle between the two stop positions of the drum hereinbefore explained. For so shifting the brush 134, as well as for preparing the circuit of the indexing coil 74 for activation when the commutator is next momentarily closed, there is provided an electromagnet 135 having an armature 136 on which the brush 134 is insulatedly mounted. Also mounted insulatedly on this armature is a contact 137 for engaging a contact **137*a* to complete connection of the indexing coil 74 to ground when the electromagnet is energized. Energization of this electromagnet is from the plus terminal 112 through the switch 120 to ground. Again, in order that only momentary closure of the switch 120 will assure that the circuit of the indexing head will remain prepared during the ensuing revolution of the drum 13, a condenser 138 is connected across the coil of the relay 135** to delay its drop-out.

In order to read off the correction indexing marks, the start-stop switch 113 is released to cause the drum to stop in its normal position, the record-reproduce switch is thrown to reproduce position, the correction marking switch is depressed and then the carriage 27 is shifted manually along the drum. Under these conditions the indexing coil 74 is grounded through contacts **122—122*a* and is connected through commutator 127, lead 126, pole 125 and contact 125*b* to the input of the amplifier 124, and the output of the amplifier is connected by contact 106*b* and pole 106 to the receiver 103. Alternatively, the output of the amplifier may now be connected to a visual marking device coordianted with the carriage for making marks on an index slip in spacial relation to the marks picked up from the record. (Note that the erase section of the head 22 is now not activated because the contacts 109—109*a* are open). Thus, as the head 22 is shifted along the drum crosswise of the tracks it will pick up the indexing signals in the path 75–C**, which will be heard and noted in relation to the position then occupied by the carriage, but the head will not pick up to any appreciable extent the recorded signals in the sound tracks because of its selective sensitivity only to the obliquely recorded indexing signals as heretofore described in connection with FIGURE 9.

When the dictator desires to read off the length marks he will latch the start-stop switch in closed position to cause the drum 13 to be stopped in a position whereat the gap 73 of the indexing head is in registration with the length marking path 75–L. Also he will shift the record-reproduce switch to reproduce position, close the switch 120 and again shift the carriage along the drum. By closing the switch 120, the contacts 137—137*a* are closed to complete a ground connection for the indexing coil and to shift the brush 134 so that it will register with the side bar 130 of the commutator in the position now occupied by the drum, thereby again completing the connection of the indexing coil to the input of the amplifier. Thus, as the carriage is shifted the length marks can be noted in relation to the respective positions of the carriage, the same as before when the indexing marks were read off of the record. Here again, of course, the amplifier may be connected to a visual marking device coordinated with the movement of the carriage for making a visual record of the length marks corresponding in spacial relation to the positioning of the marks on the record.

The embodiment of my invention herein particularly shown and described is intended to be illustrative and not limitative of my invention since the same is subject to changes and modifications without departure from the scope of my invention, which I endeavor to express according to the following claims.

I claim:

1. In a magnetic recording machine: the combination of a movable support for a magnetic record; a magnetic record-reproduce head having pole pieces engageable with the record and separated by a magnetic gap; drive means for producing a relative movement between said record and head in one direction with the head operating as a recorder and with the gap of said head oblique to said one direction; and means relatively movably mounting said head and support for movement of the head crosswise of its recorded tracks on the record with the head operating as a reproducer.

2. In a magnetic recording machine having a movable support for a magnetic record and drive means connected to said support for advancing the record in one direction: the combination of a plurality of magnetic record-reproduce heads cooperable with the record, each of said heads comprising a pair of pole pieces engageable with the record and separated by a magnetic gap and at least one of said heads having its gap oblique to said one direction of record movement and at an angle to the gap of the other head; means for feeding electrical signals to said heads for recordation thereby on the record; and means mounting said one head and record for relative movement therebetween in directions transversely of said one direction across the recorded tracks of both of said heads for picking up only the signals recorded by said one head.

3. In a magnetic recording machine having a rotatable support for a magnetic record and drive means connected to said support for rotating the record in one direction: the combination of a plurality of magnetic record-reproduce heads cooperable with the record and each having a pair of pole pieces engageable with the record and separated by a magnetic gap, at least one of said heads having its gap oblique to said one direction of record movement and at an angle to the gap of the other head; means for feeding signal energy to said heads; means for progressively advancing said heads transversely of said one direction as the record support is rotated for causing the heads to record said signal energy on successive track convolutions on the record; and means for shifting said one head crosswise of said track convolutions with the head operating as a reproducer for picking up substantially only the signals from the tracks recorded by said one head.

4. The combination set forth in claim 3 wherein the means for feeding signal energy to said one head includes means coordinated with the rotation of said support for feeding pulses of signal energy to the head when the record support is in a predetermined position of rotation.

5. The combination set forth in claim 3 wherein the means for feeding signal energy to said one head includes a plurality of selectively operable means adapted respectively for feeding pulses of signal energy to the head when the record support is in respective positions of rotation.

6. The combination set forth in claim 3 wherein said other head is a sound recording head, the gap of other head is substantially at right angles to said one direction of record movement, and said signal feeding means includes means for feeding only pulses of alternating current to said one head.

7. In a dictating machine including a rotatable support for a record having an endless record surface and a motor for driving said support: the combination of a recording head cooperable with a record on said support along successive track convolutions; means timed with rotation of said support for feeding signals to said head for recordation thereby on the record only when said support is in a predetermined position of rotation whereby the record signals in successive tracks are aligned across the record; and a clutch for coupling said drive motor to said support including means effective upon release of the clutch for stopping said support when the same next reaches said predetermined position.

8. The combination set forth in claim 7 including means for selectively conditioning said timed means for feeding signals to said head in any of a plurality of predetermined positions of rotation of said support; and means for conditioning said clutch to stop said support selectively in any of said predetermined positions.

9. In a dictating machine including a rotatable support for a record having an endless record surface and drive means for rotating said support: the combination of a recording head cooperable with a record on said support along successive track convolutions; means mounting said head for movement crosswise of the direction of rotation of said support and of said track convolutions; means for feeding signal energy to said head including means timed with the rotation of said support for rendering said feeding means operative only when said head is in registration with a predetermined line on the record crosswise of said track convolutions; and means for shifting said timed means to render said feeding means effective only to feed signal energy to said head when said head is in registration with another predetermined line on the record crosswise of said track convolutions.

10. In a dictating machine including a rotatable drum for carrying an endless record medium thereon and a drive means for rotating said drum: the combination of a record head cooperable with the record medium on said drum; circuit means placeable into operative condition wherein it is rendered capable of feeding signals to said head only while said drum is in a predetermined range of rotation; means rendered effective upon said feeding means being placed in operative condition for retaining the same therein for substantially the duration of one revolution of said drum; and control means for said drive means placeable into a stop position to cause said drum to be stopped when in the ensuing revolution of rotation the same has moved into said predetermined range.

11. In a magnetic recording machine having a rotatable support for a magnetic record and drive means connected to said support for rotating the record in one direction: the combination of a plurality of magnetic record-reproduce heads cooperable with the record and each having a pair of pole pieces engageable with the record and separated by a magnetic gap, at least one of said heads having its gap oblique to said one direction of record movement and at an angle to the gap of the other head; means for feeding signal energy to said other head; means coordinated with the rotation of said support for selectively feeding pulses of signal energy to said one head only when the record support is in a predetermined position of rotation; means for progressively advancing said heads transversely of said one direction as the record support is rotated for causing the heads to define successive track convolutions on the record; clutch means for connecting said drive means to said support including means effective upon release of the clutch for stopping said record support in said predetermined position of rotation; and means operable while said record support is at standstill in said predetermined position of rotation for shifting said one head crosswise of said track convolutions across said recorded pulses with the head operating as a reproducer.

References Cited in the file of this patent

UNITED STATES PATENTS

| | | |
|---|---|---|
| 2,573,303 | Bozoky | Oct. 30, 1951 |
| 2,698,183 | Lang | Dec. 28, 1954 |
| 2,712,572 | Roberts | July 5, 1955 |
| 2,736,776 | Camras | Feb. 28, 1956 |
| 2,761,899 | Keith et al. | Sept. 4, 1956 |
| 2,822,426 | Dinsmore | Feb. 4, 1958 |
| 2,866,012 | Ginsburg et al. | Dec. 23, 1958 |
| 2,866,855 | La Forest | Dec. 30, 1958 |
| 2,883,476 | Dermond et al. | Apr. 21, 1959 |

FOREIGN PATENTS

| | | |
|---|---|---|
| 174,220 | Austria | Mar. 10, 1953 |